(12) United States Patent
Rizzardini et al.

(10) Patent No.: US 12,007,521 B2
(45) Date of Patent: Jun. 11, 2024

(54) DETECTION METHOD OF A USER OF AN APPARATUS FOR CONTROLLING ONE OR MORE FUNCTIONALITIES OF THE APPARATUS

(71) Applicant: STMicroelectronics S.r.l., Agrate Brianza (IT)

(72) Inventors: Federico Rizzardini, Settimo Milanese (IT); Lorenzo Bracco, Chivasso (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 150 days.

(21) Appl. No.: 17/867,175

(22) Filed: Jul. 18, 2022

(65) Prior Publication Data

US 2023/0025202 A1  Jan. 26, 2023

(30) Foreign Application Priority Data

Jul. 26, 2021  (IT) .......................... 102021000019814

(51) Int. Cl.
 *G01V 3/08*  (2006.01)
 *H02J 50/20*  (2016.01)
(52) U.S. Cl.
 CPC .............. *G01V 3/088* (2013.01); *H02J 50/20* (2016.02)
(58) Field of Classification Search
 CPC ................................ H02J 50/20; G01V 3/088
 See application file for complete search history.

(56) References Cited

U.S. PATENT DOCUMENTS

| 5,844,415 A | 12/1998 | Gershenfeld et al. |
| 6,188,318 B1 | 2/2001 | Katz et al. |
| 6,922,059 B2 | 7/2005 | Zank et al. |
| 7,489,024 B2 | 2/2009 | Socher et al. |
| 8,274,386 B1 | 9/2012 | Dea et al. |
| 10,042,446 B2 | 8/2018 | Yoon et al. |
| 2006/0251293 A1 | 11/2006 | Piirainen et al. |
| 2014/0232516 A1 | 8/2014 | Stivoric et al. |
| 2016/0195630 A1 | 7/2016 | Aponte Luis |

(Continued)

FOREIGN PATENT DOCUMENTS

| EP | 0725960 B1 | 8/2000 |
| EP | 0896678 B1 | 2/2003 |

(Continued)

OTHER PUBLICATIONS

Translation of KR-2017110436-A (Year: 2017).*

(Continued)

*Primary Examiner* — Paresh Patel
(74) *Attorney, Agent, or Firm* — Seed IP Law Group LLP (57) ABSTRACT

A detection method of a user of an apparatus is provided in which the apparatus is coupled to a charge variation sensor having a control unit and an electrode to detect an electric/electrostatic charge variation of the user. The detection method includes acquiring, through the electrode, a charge variation signal indicative of the presence of the user. A filtered signal is generated by filtering the charge variation signal. A feature signal is generated as a function of the filtered signal. A movement signal indicative of a movement of the user is generated as a function of the feature signal. A presence signal indicative of the presence of the user is generated as a function of the movement signal.

20 Claims, 5 Drawing Sheets

(56) References Cited

U.S. PATENT DOCUMENTS

| | | |
|---|---|---|
| 2016/0216794 A1 | 7/2016 | Yoon et al. |
| 2016/0342781 A1 | 11/2016 | Jeon |
| 2018/0367656 A1 | 12/2018 | Kim et al. |
| 2020/0174452 A1 | 6/2020 | Zhao et al. |
| 2021/0081032 A1* | 3/2021 | Passaniti ................ G06V 40/25 |
| 2021/0285773 A1* | 9/2021 | Alessi .................. G01C 21/206 |
| 2021/0312778 A1 | 10/2021 | Passaniti et al. |
| 2021/0328824 A1* | 10/2021 | Strutt ...................... G01S 15/04 |
| 2022/0171045 A1* | 6/2022 | Johnston ................. H02J 50/20 |
| 2022/0326806 A1* | 10/2022 | Rizzardini ............ G06F 3/0488 |
| 2023/0023062 A1 | 1/2023 | Alessi et al. |
| 2023/0075382 A1* | 3/2023 | Rivolta ................. A61B 5/1118 |

FOREIGN PATENT DOCUMENTS

| | | | |
|---|---|---|---|
| EP | 1587041 A2 | 10/2005 | |
| EP | 2533219 A1 | 12/2012 | |
| EP | 2980609 A1 | 2/2016 | |
| EP | 3190569 A1 | 7/2017 | |
| EP | 3372460 A1 | 9/2018 | |
| EP | 3791787 A1 | 3/2021 | |
| KR | 20110061750 A | 6/2011 | |
| KR | 1020110061750 A | 6/2011 | |
| KR | 2017110436 A | * 10/2017 | ............. G01B 7/044 |
| KR | 102160255 B1 | 9/2020 | |

OTHER PUBLICATIONS

Amoruso et al., "An improved model of man for ESD applications," *Journal of Electrostatics 49*:225-244, 2000.

Ficker, "Electrification of human body by walking," *Journal of Electrostatics 64*:10-16, 2006.

Kurita, "Development of Non-Contact Measurement System of Human Stepping," *SICE Annual Conference*, The University Electro-Communications, Japan, Aug. 20-22, 2008, pp. 1067-1070.

\* cited by examiner

DETECTION METHOD OF A USER OF AN APPARATUS FOR CONTROLLING ONE OR MORE FUNCTIONALITIES OF THE APPARATUS

BACKGROUND

Technical Field

The present disclosure relates to a detection method of a user of an apparatus for controlling one or more functionalities of the apparatus. Furthermore, it relates to a method for controlling the apparatus which comprises said detection method, to a computer program product thereof, to said control unit and to the same apparatus.

Description of the Related Art

As known, the improvement of the user experience allows making the use of computers, PCs, portable devices and smart appliances easier and simpler.

In particular, with exemplary reference to the case of a PC, the improvement of the user experience may comprise the automatic reactivation of the PC (i.e., the switching of the PC from the standby state to the use state), which therefore causes the enabling of functionalities such as automatic and zero-touch access to PC files, quick start of the PC, activation of biometric recognition, deactivation of the screensaver, activation of PC components, enabling or disabling of functions for energy saving and for improving battery life.

Most of the known solutions that allow the automatic reactivation of the PC are based on sensor modules comprising optical sensors, e.g., infrared, IR, sensors. However, infrared sensors (in detail, of "Time of Flight," ToF, type) generally used for this purpose often have a limited field of view (e.g., of conical shape and typically with an opening angle of around 30 degrees), may detect the presence of a PC user only when the latter is in the field of view, and consume large amounts of energy mainly due to the continuous use of the IR source. Similar limitations also exist for known solutions based on ultrasonic or radar sensors.

Other known solutions use sensor modules comprising electric/electrostatic charge variation sensors to detect the presence of the user. Although the use of these sensors reduces the energy consumption required for detection with respect to the case of optical, ultrasonic or radar sensors, the need to have an alternating electric current (e.g., of 50 or 60 Hz depending on the country one is in) to be detected through the electric/electrostatic charge variation sensors and the external processing of the signals generated thereby reduce the functionality and increase the complexity and energy consumption of these solutions.

In fact, the known solutions generally use the main control unit of the PC (e.g., the application processor, AP) to process the signals generated by the sensor modules. Consequently, this main control unit of the PC needs to remain constantly active and in operation in order to determine the presence of the PC user to reactivate the latter. This increases the energy consumption of the PC and decreases its usability (e.g., reduced use time between one recharge and the next).

BRIEF SUMMARY

In various embodiments, the present disclosure relates to a detection method of the user which is performed by a control unit of an electric and/or electrostatic charge variation sensor, and which allows to generate a movement signal and a presence signal used to enable/disable one or more functionalities of the apparatus (e.g., switches on a PC screen).

In one or more embodiments, the present disclosure provides a detection method of a user of an apparatus for controlling one or more functionalities of the apparatus, which overcomes the drawbacks of the prior art.

In one or more embodiments, a detection method of a user of an apparatus is provided. The apparatus is operatively coupled to a charge variation sensor having at least one electrode and a control unit electrically coupled to each other. The at least one electrode is configured to detect a respective electric or electrostatic charge variation caused by the presence of the user in a detection region of the at least one electrode. The detection method includes: acquiring, by the control unit and through the at least one electrode, a charge variation signal indicative of the presence or absence of the user in the detection region; generating, by the control unit and as a function of the charge variation signal, one or more feature signals indicative of respective features of the charge variation signal; generating, by the control unit and as a function of the one or more feature signals, a movement signal which has a value equal to a first value or to a second value, the first value of the movement signal being indicative of the absence of movement by the user in the detection region and the second value of the movement signal being indicative of a movement of the user in the detection region; and generating, by the control unit and as a function of the movement signal, a presence signal which has a value equal to a first value or to a second value, the first value of the presence signal being indicative of the absence of the user from the detection region and the second value of the presence signal being indicative of the presence of the user in the detection region.

In at least one embodiment, a control method of an apparatus for activating one or more functionalities of the apparatus is provided. The apparatus is usable by a user and includes a main control unit operatively coupled to a charge variation sensor having at least one electrode and a control unit electrically coupled to each other. The at least one electrode is configured to detect a respective electric or electrostatic charge variation caused by the presence of the user in a detection region of the at least one electrode. The control method includes: performing the detection method; receiving, by the main control unit, the movement signal or the presence signal; and controlling, by the main control unit, said one or more functionalities of the apparatus as a function of the movement signal or of the presence signal.

In at least one embodiment, a computer program product is provided that is loadable into a control unit of a charge variation sensor which is operatively coupled to an apparatus usable by a user and which includes at least one electrode electrically coupled to the control unit and configured to detect a respective electric or electrostatic charge variation caused by the presence of the user in a detection region of the at least one electrode. The computer program is configured to, when executed, cause the control unit to implement the detection method of the user.

In at least one embodiment, a charge variation sensor is provided that is operatively couplable to an apparatus usable by a user. The charge variation sensor includes at least one electrode configured to detect a respective electric or electrostatic charge variation caused by the presence of the user in a detection region of the at least one electrode, and a control unit electrically couple to the at least one electrode. The control unit is configured to: acquire, through the at least one electrode, a charge variation signal indicative of the presence or absence of the user in the detection region; generate, as a function of the charge variation signal, one or more feature signals indicative of respective features of the charge variation signal; generate, as a function of the one or more feature signals, a movement signal which has a value equal to a first value or to a second value, the first value of the movement signal being indicative of the absence of movement by the user in the detection region and the second value of the movement signal being indicative of a movement of the user in the detection region; and generate, as a function of the movement signal, a presence signal which has a value equal to a first value or to a second value, the first value of the presence signal being indicative of the absence of the user from the detection region and the second value of the presence signal being indicative of the presence of the user in the detection region.

In at least one embodiment, an apparatus is provided that is usable by a user and operatively coupled to a charge variation sensor having at least one electrode and a control unit electrically coupled to each other. The at least one electrode is configured to detect a respective electric or electrostatic charge variation caused by the presence of the user in a detection region of the at least one electrode. The control unit is configured to: acquire, through the at least one electrode, a charge variation signal indicative of the presence or absence of the user in the detection region; generate, as a function of the charge variation signal, one or more feature signals indicative of respective features of the charge variation signal; generate, as a function of the one or more feature signals, a movement signal which has a value equal to a first value or to a second value, the first value of the movement signal being indicative of the absence of movement by the user in the detection region and the second value of the movement signal being indicative of a movement of the user in the detection region; and generate, as a function of the movement signal, a presence signal which has a value equal to a first value or to a second value, the first value of the presence signal being indicative of the absence of the user from the detection region and the second value of the presence signal being indicative of the presence of the user in the detection region.

BRIEF DESCRIPTION OF THE SEVERAL VIEWS OF THE DRAWINGS

For a better understanding of the present disclosure, a preferred embodiment is now described, purely by way of non-limiting example, with reference to the attached drawings, wherein.

DETAILED DESCRIPTION

Figure 1:
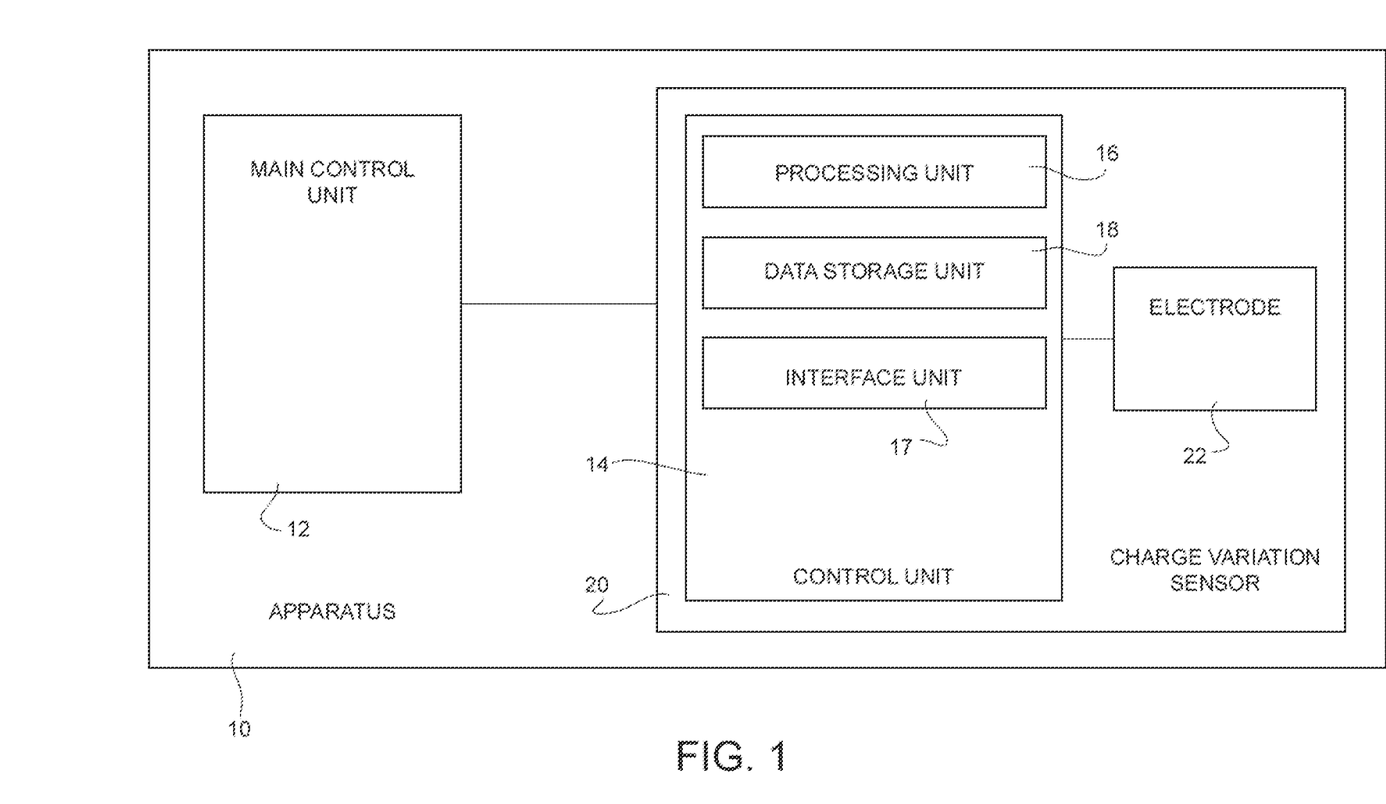
FIG. 1 shows a block diagram of an apparatus comprising an electric and/or electrostatic charge variation sensor, according to an embodiment of the present disclosure.

FIG. 1 illustrates, schematically, an apparatus 10 according to an aspect of the present disclosure. By way of non-limiting example, the apparatus 10 is an electronic apparatus such as a PC, a tablet, a computer, a portable device (e.g., wearable) or a smart appliance. Hereinafter the case wherein the apparatus 10 is a PC is considered and shown by way of non-limiting example.

In use and as better described below with reference to FIG. 3, some functionalities (e.g., options and/or configurations) of the apparatus 10 are activated automatically and selectively when the presence of a user ready to use the apparatus 10 (i.e., when the user is in a use position of the apparatus 10 which allows him/her to use the apparatus 10, for example when he/she is sitting in front of the PC) is detected.

The apparatus 10 comprises a main control unit 12 (which may be or include control circuitry, such as an AP or a dedicated microprocessor, or any other suitable circuitry configured to perform the functionalities described herein) for controlling the apparatus 10, and an electric and/or electrostatic charge variation sensor (hereinafter referred to as a charge variation sensor and indicated with the reference number 20) for detecting the user of the apparatus. The main control unit 12 and the charge variation sensor 20 are operatively coupled to each other, for example they are electrically coupled to each other. For example, the charge variation sensor 20 is carried by the apparatus 10, and therefore comprised in the latter.

In use and as better described below, the charge variation sensor 20 generates a presence signal (indicative of the presence of the user in the use position of the apparatus 10, and indicated in FIG. 3 with the reference $S_P$) and a movement signal (indicative of a movement occurred in proximity to the apparatus 10, and indicated in FIG. 3 with the reference $S_M$) at output, which are received by the main control unit 12 which consequently controls the apparatus 10. In detail, the main control unit 12 controls one or more functionalities of the apparatus 10 as a function of the presence signal and/or of the movement signal: examples of these functionalities to be activated/deactivated are the switching of the apparatus 10 from a standby state to a use (or work) state, the switching on of a screen of the apparatus 10 (indicated in FIG. 2 with the reference number 38), automatic and zero-touch access to documents saved in the apparatus 10, the quick start of the apparatus 10, the activation of the biometric recognition, the deactivation of the screen saver, the enabling or disabling of functions for energy saving and battery consumption.

In particular, the charge variation sensor 20 comprises a control unit 14 and one or more electrodes 22, electrically coupled to each other. For example, the control unit 14 is integrated in the charge variation sensor 20. Hereinafter, reference is exemplarily made to the case wherein one electrode 22 is present; nevertheless, the number of electrodes 22 may be similarly greater (e.g., two or more electrodes 22).

In use, the electrode 22 detects an environmental electric and/or electrostatic charge variation (i.e., generated by the interaction of the user with the surrounding environment) and generates a respective charge variation signal $S_Q$ indicative of said electric and/or electrostatic charge variation.

The electrode 22 may have a metal surface or be totally of metal coated with a dielectric material, or even have a metal surface arranged under a case of the apparatus 10. In any case, during use the electrode 22 is electrically/electrostatically coupled to the environment in which the apparatus 10 is present, and in more detail to the user of the apparatus 10, in order to detect the induced electric/electrostatic charge variation thereof.

According to an embodiment, the electrode 22 is integrated into the case of the apparatus 10, and for example comprises a conductive track formed on, or in, a semiconductor material wafer comprised in the apparatus 10. According to a different embodiment, the electrode 22 is a metal element present in the apparatus 10, such as the same outer case or a frame of the apparatus 10. Optionally, when a possible use of the apparatus 10 in a humid environment (more specifically in water) is expected, the electrode 22 is inserted inside a waterproof case, or in any case it is shielded through one or more protective layers, so as to prevent direct contact of the electrode 22 with water or humidity: in this case, the waterproof case or the one or more protective layers are of a material (e.g., dielectric or insulating material, such as plastic) such as not to shield the electric/electrostatic charge generated by the user, which is to be acquired by the electrode 22. Other embodiments are possible, as apparent to the person skilled in the art, so that the electrode 22 is electrically/electrostatically coupled to the user during use.

Furthermore, according to an exemplary embodiment, the control unit 14 (such as a CPU, a microprocessor, a microcontroller or a dedicated calculation unit) comprises, coupled to each other: an interface unit 17 (optional and of known type) electrically coupled to the electrode 22 to interface the latter with the control unit 14 (e.g., the interface unit 17 comprises an amplification circuit and/or an analog-to-digital converter, ADC, not shown); a processing unit 16 for processing the charge variation signal $S_Q$ acquired by the electrode 22 (and optionally processed by the interface unit 17); and a data storage unit 18 (such as a memory, e.g., a non-volatile memory) for storing the acquired data.

Figure 2:
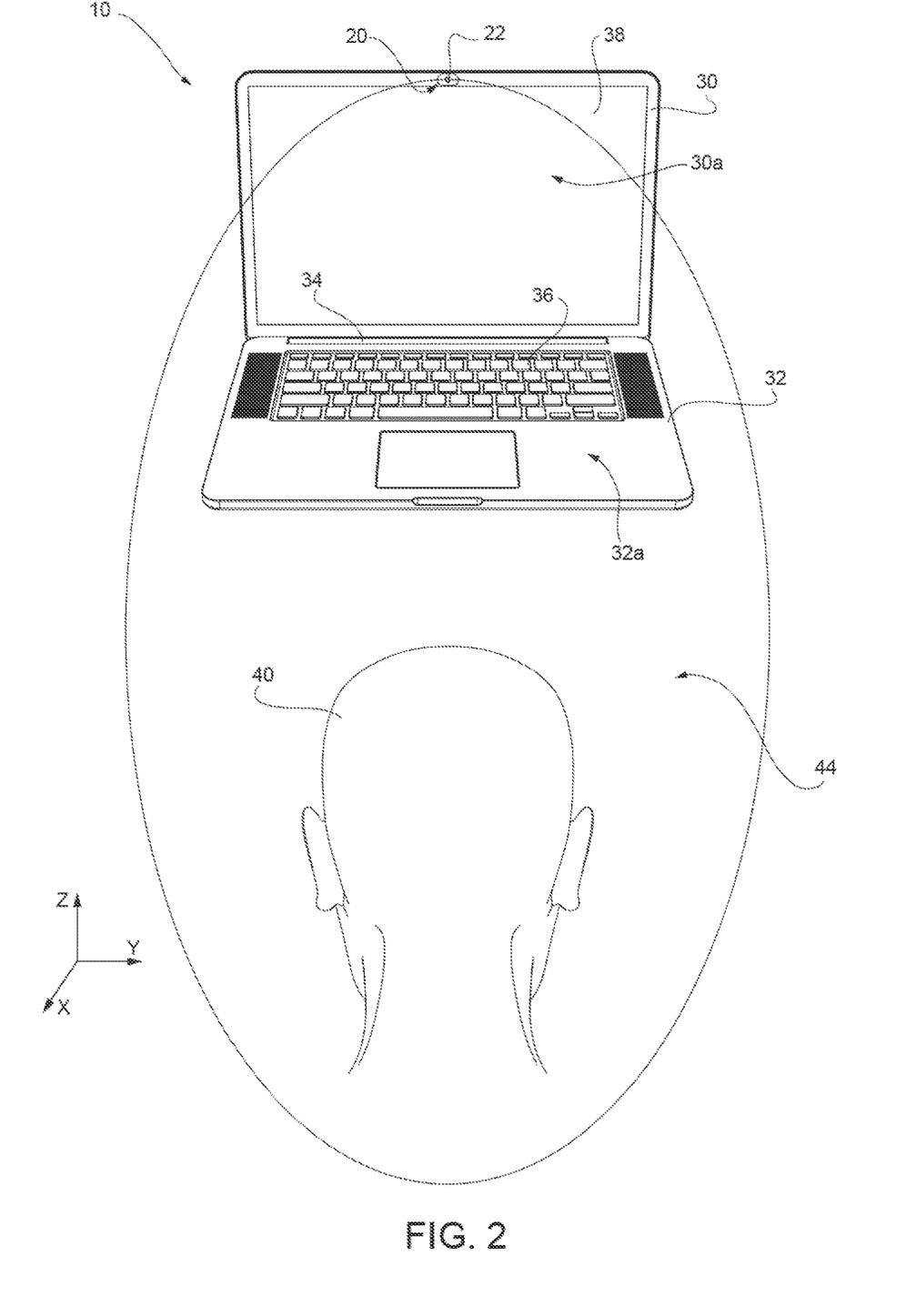
FIG. 2 schematically shows the apparatus of FIG. 1, in use and with a user in a use position of the apparatus, according to an exemplary embodiment of the present disclosure.

As exemplarily shown in FIG. 2 in a triaxial Cartesian reference system defined by axes X, Y and Z, the portable device 10 includes a lid portion 30 and a base portion 32, mechanically coupled to each other by a hinge 34 which allows a rotation of the lid portion 30 with respect to the base portion 32, forming a rotation constraint around a rotation axis (in FIG. 2 exemplarily shown parallel to the Y-axis). For example, the base portion 32 comprises at least one interface device 36 (e.g., keyboard and/or trackpad) extending at a surface 32a of the base portion 32, and the lid portion 30 comprises said screen 38 extending at a front surface 30a of the lid portion 30. In the embodiment shown in FIG. 2, the electrode 22 is carried by the lid portion 30 (and therefore is integral therewith), for example at the front surface 30a and on the opposite side of the screen 38 with respect to the hinge 34.

In detail, the electrode 22 detects the presence of the user (indicated in FIG. 2 with the reference number 40) when the latter is in a detection region 44 of the electrode 22. The shape and extension of the detection region 44 depend in a per se known manner on the electrode 22 (e.g., geometric shape, material, etc.) and on the environment (e.g., presence of objects or walls). For example, the detection region 44 comprises a portion of the environment in which the 10 is present, which faces the front surface 30a. In general, however, the electrode 22 is designed and oriented in such a way that the detection region 44 comprises the use position of the user 40, i.e., it is such that the user 40 is in the detection region 44 when using the apparatus 10. For example, the detection region 44 is defined as the region of the environment in which the electrode 22 allows the detection of the presence of the user 40.

Figure 3:
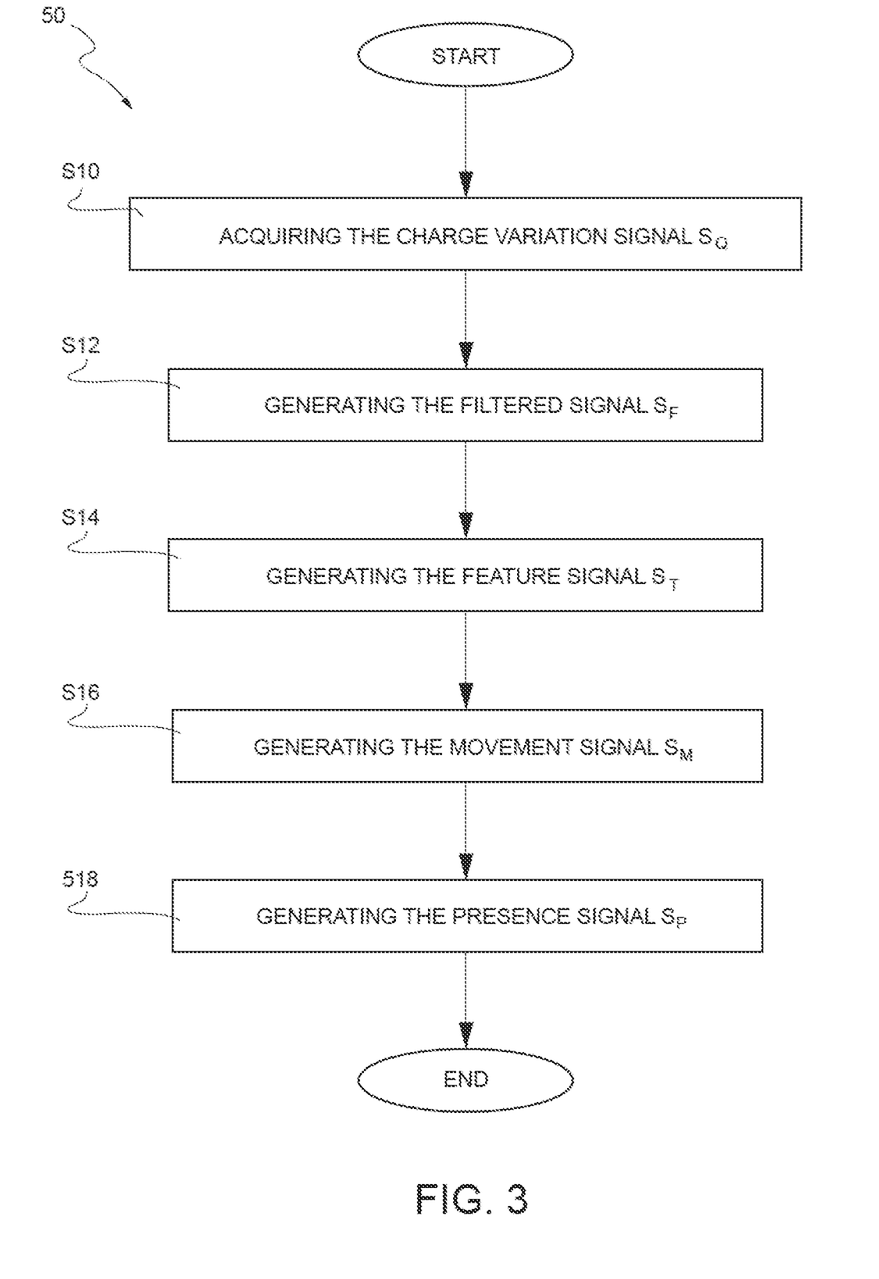
FIG. 3 is a block diagram of a detection method of the user, performed by a control unit of the electric and/or electrostatic charge variation sensor of FIG. 1, according to an exemplary embodiment of the present disclosure.

FIG. 3 shows a detection method 50 of the user 40, performed by the control unit 14 to generate the movement signal and the presence signal indicative of the presence of the user 40.

The movement signal and the presence signal then allow one or more functionalities of the apparatus 10 to be automatically activated, by the main control unit 12 receiving them. In particular, when the user 40 is in a position associated with the use of the apparatus 10 (said use position of the apparatus 10, and for example when the user 40 is sitting in front of the apparatus 10), the one or more functionalities of the apparatus 10 are controlled and for example activated and/or kept active. Otherwise, when the user 40 is not in the use position of the apparatus 10, these functionalities of the apparatus 10 are not active (e.g., the apparatus 10 is in standby). Hereinafter, reference is exemplarily made to switching on the screen 38 as a functionality to be activated; nevertheless, it is apparent that other functionalities may be similarly considered, in place of or in addition to switching on the screen 38.

In particular, the detection method 50 is performed iteratively.

The detection method 50 begins with a rest (or standby) condition of the apparatus 10, wherein the screen 38 is off and the charge variation sensor 22 is on (i.e., the detection of the electric/electrostatic charge variations is active).

At a step S10 the charge variation signal $S_Q$ is acquired by the electrode 22, and is for example sampled at an established frequency (e.g., about 240 Hz). In detail, the charge variation signal $S_Q$ is a digital signal, for example previously processed by the interface unit 17.

Figure 4A:
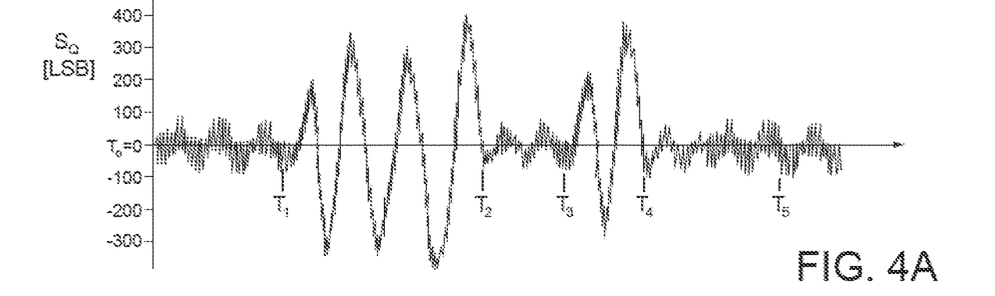
FIGS. 4A-4E are graphs of electrical signals acquired/generated by the electric and/or electrostatic charge variation sensor of FIG. 1, according to an exemplary embodiment of the present disclosure.

An example of the charge variation signal $S_Q$ is provided in FIG. 4A. In the example of FIG. 4A, the charge variation signal $S_Q$ has an oscillatory trend with an oscillation amplitude which is smaller in a first temporal region, in a third temporal region and in a fifth temporal region (e.g., it is less than ±100 LSB in the first temporal region $T_0 \leq t < T_1$, in the third temporal region $T_2 \leq t < T_3$, and in the fifth temporal region $t > T_4$, with for example $T_1 \simeq 350$ ms, $T_2 \simeq 850$ ms, $T_3 \simeq 1200$ ms and $T_4 \simeq 1400$ ms), and which is greater in a second temporal region and in a fourth temporal region (e.g., it is greater than ±100 LSB in the second temporal region $T_1 \leq t < T_2$ and in the fourth temporal region $T_3 \leq t < T_4$).

Figure 4B:
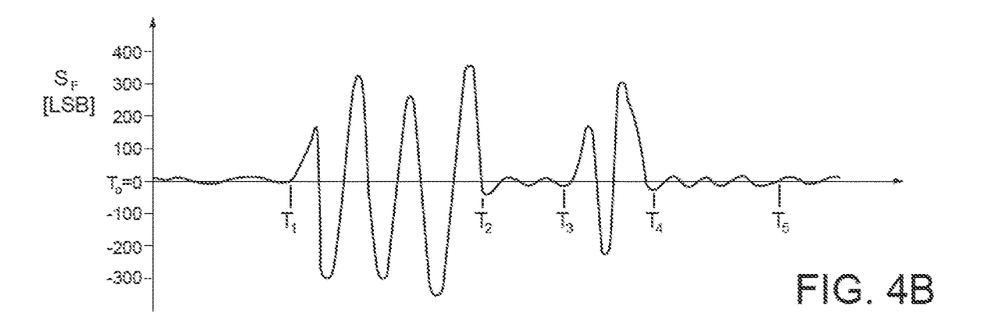

At a step S12 immediately following step S10, a low-pass filtering of the charge variation signal $S_Q$ is performed to generate a filtered signal $S_F$ at low frequencies (so as to remove the contribution of the alternating electric current at 50 Hz or 60 Hz). The filtered signal $S_F$ obtained by filtering the exemplarily considered charge variation signal $S_Q$ is shown in FIG. 4B, wherein it may be seen that the high-frequency components have been removed. In detail, the low-pass filter implemented in step S12 has a cut-off frequency that is lower than a threshold cut-off frequency, for example comprised between 1 Hz and 20 Hz and for example equal to 5 Hz. According to an exemplary embodiment, the low-pass filter is of infinite impulse response, IRR, type and with order equal to 2 and with cut-off frequency equal to 5 Hz. Otherwise, the filtering of the charge variation signal $S_Q$ operated at step S12 is of band-pass type, for example with a lower cut-off frequency comprised between 0.01 Hz and 1 Hz (e.g., equal to 0.1 Hz) and with a higher cut-off frequency comprised between 1 Hz and 20 Hz (e.g., equal to 5 Hz), and allows the filtered signal $S_F$ to be generated at low frequencies similarly to what has been previously described.

At a step S14 immediately following step S12, one or more feature signals $S_T$ are generated which are indicative of respective features of the charge variation signal $S_Q$ (in greater detail, of the filtered signal $S_F$). These features are quantities of interest of the filtered signal $S_F$, such as statistical quantities of the filtered signal $S_F$ (e.g., peak-to-peak amplitude, variance, number of peaks with amplitude being greater than a threshold, standard deviation, energy, etc.) which are for example calculated in a time window, for example having a predefined duration (e.g., equal to about 0.05 seconds, corresponding to 12 samples if the signal is sampled at 240 Hz). According to an embodiment exemplarily considered below and shown in FIG. 4C, at step S14 a feature signal $S_T$ is generated which is indicative of the peak-to-peak amplitude of the filtered signal $S_F$; however, different and further quantities of interest of the filtered signal $S_F$ may be similarly considered, in addition to or in place of the peak-to-peak amplitude.

Figure 4C:
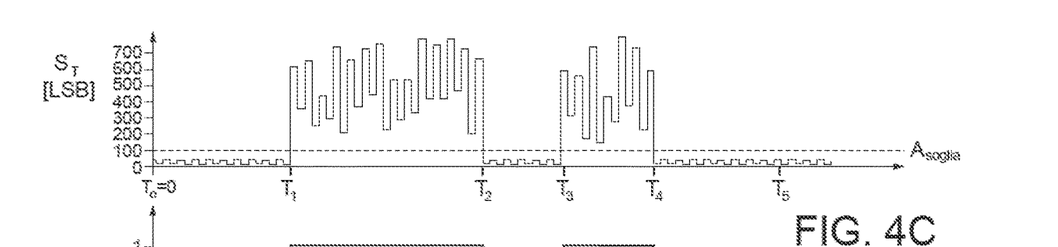

According to an embodiment, at each instant, a respective peak-to-peak amplitude value is calculated on the basis of the filtered signal $S_F$ in the time window ending in that considered instant. In other words, the feature signal $S_T$ is calculated through sliding window approach: considering a generic instant t* and the time window, here indicated with $T_{slide}$ and for example comprised between 10 ms and 500 ms (e.g., equal to 50 ms), the feature signal $S_T$ at this instant t* has a value given by the peak-to-peak amplitude (calculated as difference between maximum amplitude and minimum amplitude) of the filtered signal $S_F$ in the time interval $t^*-T_{slide} \leq t \leq t^*$.

According to a different embodiment shown in FIG. 4C, the time windows for calculating the feature signal $S_T$ are subsequent to and not superimposed on each other: for each time window, a respective peak-to-peak amplitude value, which is the value that the feature signal $S_T$ assumes in said considered time window, is calculated as the difference between a maximum amplitude and a minimum amplitude in said time window.

With reference to the feature signal $S_T$ exemplarily shown in FIG. 4C, it is noted that the values of the feature signal $S_T$ are substantially zero in the first temporal region, in the third temporal region and in the fifth temporal region (less than or equal to a threshold peak-to-peak amplitude $A_{threshold}$ for example comprised between 50 LSB and 400 LSB and for example equal to 100 LSB), while they are greater than the threshold peak-to-peak amplitude $A_{threshold}$ at the second temporal region and the fourth temporal region.

At a step S16 immediately following step S14, the movement signal (exemplarily shown in FIG. 4D and indicated with the reference $S_M$) indicative of a movement that occurred in the detection region 44 by the user 40, is generated as a function of the feature signal $S_T$. In particular, the movement signal $S_M$ assumes, at each considered time instant, a first value (e.g., 0) when no movement is detected in the detection region 44 by the user 40, or a second value (e.g., 1) when a movement of the user 40 is detected in the detection region 44.

Figure 4D:
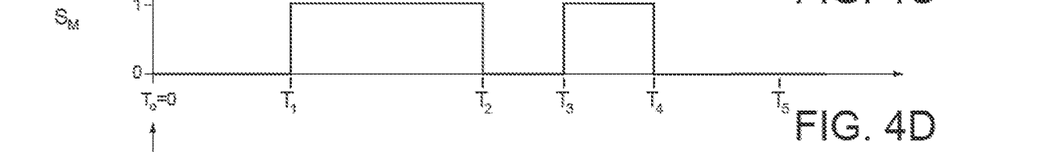

According to an embodiment, the movement signal $S_M$ is generated by comparing the feature signal $S_T$ with a feature threshold value (in the exemplarily considered embodiment, the threshold peak-to-peak amplitude $A_{threshold}$): when the value of the feature signal $S_T$ at the considered instant is greater than the threshold peak-to-peak amplitude $A_{threshold}$, the corresponding value of the movement signal $S_M$ assumes the second value; and when the value of the feature signal $S_T$ at the considered instant is smaller than, or equal to, the threshold peak-to-peak amplitude $A_{threshold}$, the corresponding value of the movement signal $S_M$ assumes the first value. In detail, the feature threshold value is chosen in the design step as a function of the feature under consideration and of parameters such as the structure of the electrode 22, the shape and extension of the detection region 44, the detection sensitivity desired by the user, etc.; consequently, the feature threshold value is generally obtained in a heuristic manner or is set by the same user, and the values of the threshold peak-to-peak amplitude $A_{threshold}$ indicated herein are provided for illustrative and non-limiting purposes only.

According to a different embodiment, the movement signal $S_M$ is generated by processing the feature signal $S_T$ through machine learning techniques, and in detail through a classifier such as a support vector machine, SVM, a decision tree, DT, or a neural network, NN. In detail, the classifier is trained to generate the corresponding movement signal $S_M$ once the feature signal $S_T$ has been received at input. The training of the classifier is of a per se known type and depends, in a known manner, on the specific classifier chosen and on the design parameters of the apparatus 10. Exemplarily details regarding the training of the classifier implemented as a decision tree are provided for example in the document https//www.st.com/resource/en/application_note/dm00563460-lsm6dsox-machine-learning-core-stmicroelectronics.pdf. The training of the classifier is, for example, of supervised type and may comprise the use of an optimization algorithm of known type. In detail, the classifier is trained on the basis of a training dataset which comprises multiple training feature signals having respective labels associated therewith, indicative of the presence or absence of movements in the detection region 44 by the user 40. The classifier is trained on the basis of training feature signals which are similar to the feature signals $S_T$. During use, the classifier receives the feature signals $S_T$ acquired in the interval relating to the considered instant as inputs and processes them on the basis of the classification model obtained during the training step to generate the corresponding movement signal $S_M$.

At a step S18 immediately following step S16, the presence signal (exemplarily shown in FIG. 4E and indicated with the reference $S_P$) indicative of the presence of the user 40 in the detection region 44, is generated as a function of the movement signal $S_M$. In particular, the presence signal $S_P$ assumes, at each considered time instant, a first value (e.g., 0) when the presence of the user 40 is not detected in the detection region 44, or a second value (e.g., 1) when the presence of the user 40 is detected in the detection region 44. In detail, while the movement signal $S_M$ is indicative of instantaneous movements and of reduced time duration (e.g., less than about 2 seconds), the presence signal $S_P$ is indicative of a presence of the user 40 being steady and prolonged over time in the detection region 44 (e.g., comprised between 2 seconds and 5 minutes and for example equal to 30 seconds), and therefore of the period of time wherein the screen 38 needs to or should be on to allow the user 40 to use the apparatus 10.

Figure 4E:
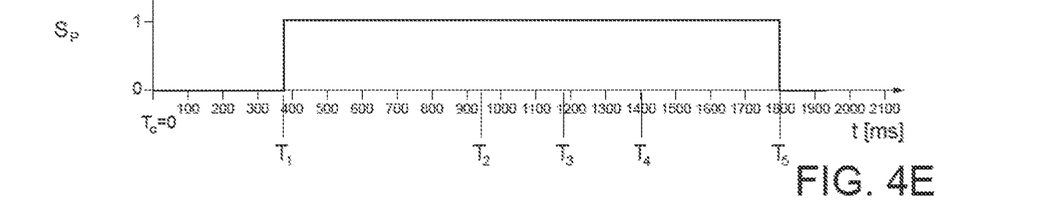

In detail, the presence signal $S_P$ is initially ($t=T_0$) set to the first value. The presence signal $S_P$ switches from the first to the second value whenever the movement signal $S_M$ goes from the first to the second value, and remains equal to the second value until a wait interval $T_{wait}$ (e.g., comprised between about 2 seconds and about 5 minutes and for example equal to about 30 seconds) has elapsed, from the last instant in which the movement signal $S_M$ had the second value. In other words, whenever a movement of the user 40 is detected in the detection region 44, the presence signal $S_P$ goes from the first to the second value, and returns to the first value (no presence) only after said wait interval $T_{wait}$ has elapsed from the last movement detection of the user 40 in the detection region 44. For example, the control unit 20 implements a counter which is reset whenever the movement signal $S_M$ assumes the second value, and which counts the number of instants subsequent to one another in which the movement signal $S_M$ assumes the first value: when the counter reaches a number of instants corresponding to the fact that the wait interval $T_{wait}$ has elapsed, the presence signal $S_P$ returns from the second to the first value and maintains the first value until the subsequent instant in which the movement signal $S_M$ assumes the second value. Consequently, the wait interval $T_{wait}$ provides a time interval in which the user 40 may not move (or exit the detection region 44 and then enter again before the wait interval $T_{wait}$ has elapsed) without thereby deactivating the functionalities of the apparatus (e.g., without the screen 38 being switched off).

In the embodiment exemplarily described with reference to FIG. 4E, the presence signal $S_P$ is equal to the first value in the first temporal region $T_0 \leq t < T_1$ and, exemplarily considering the case in which $T_3-T_2 < T_{wait}$, the presence signal $S_P$ remains equal to the second value until the instant $t=T_5=T_4+T_{wait}$, when it returns equal to the first value. In fact, although in the third temporal region the movement signal $S_M$ has the first value, the period elapsed between the two movement detections following $t=T_2$ and $t=T_3$ has a duration which is shorter than the wait interval $T_{wait}$ and therefore the presence signal $S_P$ remains in the second state; otherwise, at $t > T_4$ no movements are detected and therefore, after the wait interval $T_{wait}$ from the last movement detection being at $t=T_4$ has elapsed, the presence signal $S_P$ returns to the first value.

According to another embodiment, the presence signal $S_P$ does not go from the first to the second value whenever the movement signal $S_M$ goes from the first to the second value; instead, the presence signal $S_P$ goes from the first to the second value when the movement signal $S_M$ has assumed the second value for a detection interval $T_{detection}$ (e.g., comprised between about 0.05 seconds and about 2 seconds and for example equal to about 0.5 seconds). In other words, the presence signal $S_P$ goes from the first to the second value when said detection interval $T_{detection}$, which starts when the movement signal $S_M$ goes from the first to the second value and during which the movement signal $S_M$ maintains the second value, has elapsed. Consequently, there will be greater latency in detecting the presence of the user, but at the same time greater robustness against false detections.

Following step S18 and therefore the generation of the movement signal $S_M$ and the presence signal $S_P$, the detection method 50 ends.

According to an embodiment, the movement signal $S_M$ and/or the presence signal $S_P$ generated by the control unit 14 of the charge variation sensor 20 are then received by the main control unit 12 of the apparatus 10, which controls said one or more functionalities of the apparatus 10 as a function of the movement signal $S_M$ and/or of the presence signal $S_P$. In the exemplarily considered embodiment, the main control unit 12 switches and/or maintains the screen 38 on whenever the presence signal $S_P$ has the second value, while it switches it off and/or maintains it off whenever the presence signal $S_P$ has the first value.

Optionally, also the switching of the main control unit 12 from a standby state to a use state occurs when the presence signal $S_P$ assumes the second value.

Figure 5:
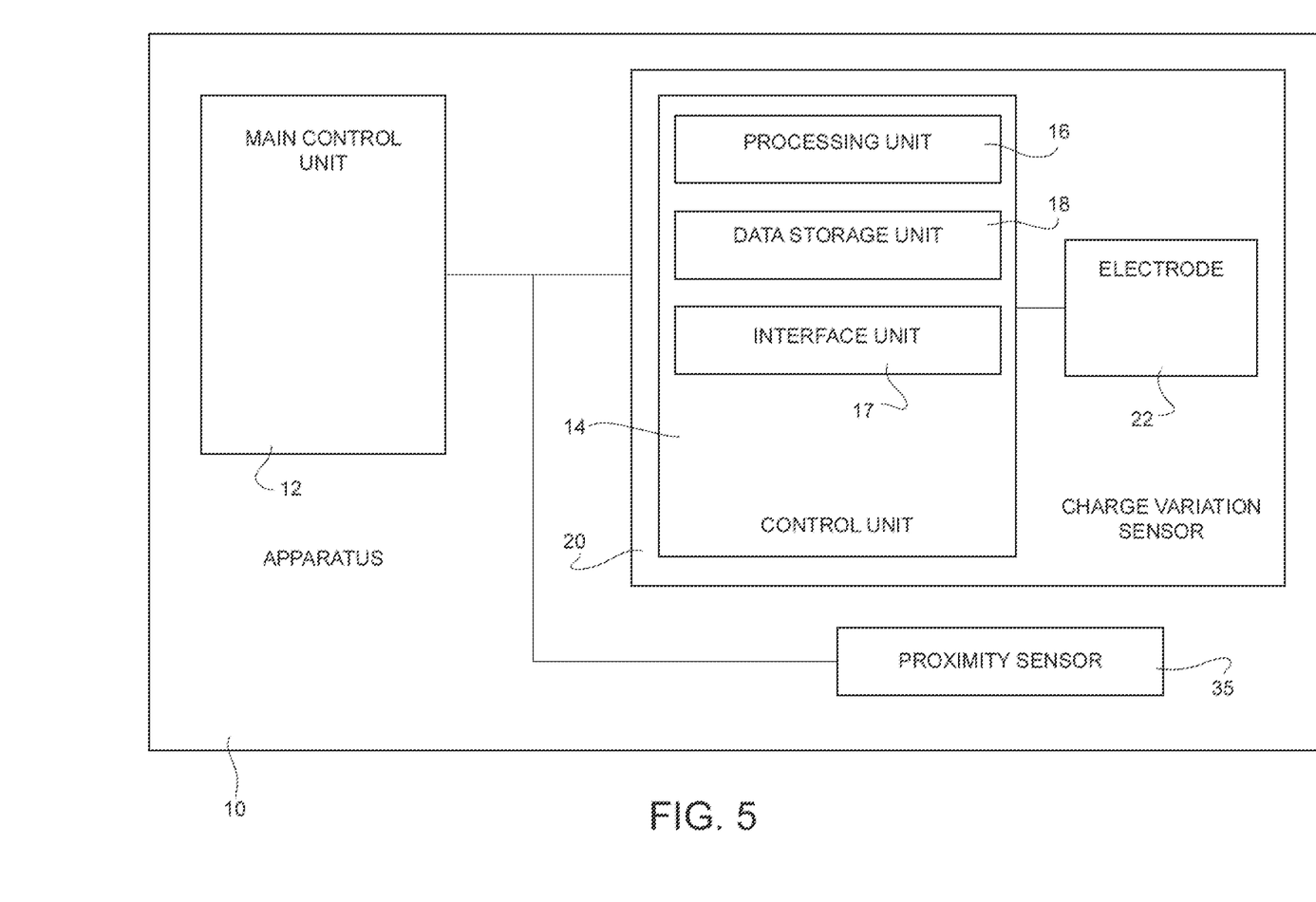
FIG. 5 shows a block diagram of a different embodiment of the apparatus of FIG. 1.

Optionally and as shown in FIG. 5, the apparatus 10 is operatively coupled, and for example also comprises a proximity sensor 35 (such as an infrared optical sensor, ultrasound or radar sensor, in particular of time-of-flight, ToF, type), for example carried by the lid portion 30. In this case, the main control unit 12 may activate the proximity sensor 35 whenever the presence signal $S_P$ assumes the second value, in order to implement a further proximity control of the user 40 with respect to the apparatus 10 before controlling said one or more functionalities of the apparatus 10. For example, the main control unit 12 may detect, through the proximity sensor 35, the distance of the user 40 from the proximity sensor 35 (and therefore from the apparatus 10), when the user 40 is in a field of view of the proximity sensor 20 (e.g., substantially of conical shape and which radiates in the detection region 44 from the proximity sensor 20), and may activate said one or more functionalities of the apparatus 10 when this distance is less than a threshold distance (e.g., 50 cm) being indicative of the fact that the user 40 is in the use position of the apparatus 10.

From an examination of the characteristics of the disclosure made according to the present disclosure, the advantages that it affords are evident.

In detail, the detection method 50 is simple to implement and does not require expensive components to be performed.

Furthermore, it allows said functionalities of the apparatus 10 to be controlled without the need for an alternating current to be present and with lower energy consumption with respect to known solutions, since the detection method 50 is performed by the control unit 14 of the charge variation sensor 20 (and not by the main control unit 12 of the apparatus 10, which would require higher energy consumption when activated with respect to the control unit 14). Furthermore, the charge variation sensor 20 has lower costs and energy consumption with respect to other known solutions for detecting the user 40, for example based on the optical detection of the latter.

Furthermore, the possibility of activating the proximity sensor 35 as a function of the presence signal $S_P$ ensures the high accuracy of detection of the user 40 operated by the proximity sensor 35, while at the same time reducing energy consumption with respect to known solutions wherein the proximity sensor 35 needs to be kept constantly on to ensure the detection of the user 40.

Finally, it is clear that modifications and variations may be made to the disclosure described and illustrated herein without thereby departing from the scope of the present disclosure.

In particular, the detection method 50 may also be used for applications such as anti-theft and smart home.

Furthermore, the shape, the arrangement and the number of electrodes 22 may vary with respect to what has been previously described. For example, two or more electrodes 22 carried by the apparatus 10 may be used at the sides of the base portion 32 opposite to each other along the rotation axis. In case of a plurality of electrodes 22, the detection signals generated thereby may be acquired in a differential manner to generate the charge variation signal $S_Q$.

Furthermore, at step S14 the feature signal $S_T$ may be generated on the basis of parameters other than the peak-to-peak amplitude, and for example using a variance of the filtered signal $S_F$. In this case, for example, it is possible to calculate the variance of the filtered signal $S_F$ at any instant using the following formula:

$$\sigma^2(t)=(1-\alpha)\cdot(\sigma^2(t-1)+\Delta(t)\cdot\varepsilon(t)),$$

with $\Delta(t)=S_F(t)-\overline{S_F(t-1)}$, $\varepsilon(t)=\alpha\cdot\Delta(t)$, and $\overline{S_F(t)}=\overline{S_F(t-1)}+\varepsilon(t)$, where $\sigma^2(t)$ is the variance of the filtered signal $S_F$, $\alpha$ is a coefficient comprised between 0 and 1 and exemplarily equal to about 0.1, $\Delta(t)$ is the difference calculated between the filtered signal $S_F$ at the instant t and the average of the filtered signal $\overline{S_F}$ at the instant t−1, $\varepsilon(t)$ is an increase calculated as the product of the difference $\Delta(t)$ and the coefficient $\alpha$, $S_F(t)$ is the value of the filtered signal $S_F$ at the instant t, and $\overline{S_F(t)}$ is the average of the filtered signal $S_F$ at the instant t.

A detection method (50) of a user (40) of an apparatus (10) operatively coupled to a charge variation sensor (20) may be summarized as including at least one electrode (22) and a control unit (14) electrically coupled to each other, the at least one electrode (22) being configured to detect a respective electric and/or electrostatic charge variation caused by the presence of the user (40) in a detection region (44) of the at least one electrode (22), the detection method (50) including the steps of: acquiring (S10), by the control unit (14) and through the at least one electrode (22), a charge variation signal ($S_Q$) indicative of the presence or absence of the user (40) in the detection region (44); generating (S12, S14), by the control unit (14) and as a function of the charge variation signal ($S_Q$), one or more feature signals ($S_T$) indicative of respective features of the charge variation signal ($S_Q$); generating (S16), by the control unit (14) and as a function of the one or more feature signals ($S_T$), a movement signal ($S_M$) which has a value equal to a first value (0) or to a second value (1), the first value (0) of the movement signal ($S_M$) being indicative of the absence of movement by the user (40) in the detection region (44) and the second value (1) of the movement signal ($S_M$) being indicative of a movement of the user (40) in the detection region (44); and generating (S18), by the control unit (14) and as a function of the movement signal ($S_M$), a presence signal ($S_P$) which has a value equal to a first value (0) or to a second value (1), the first value (0) of the presence signal ($S_P$) being indicative of the absence of the user (40) from the detection region (44) and the second value (1) of the presence signal ($S_P$) being indicative of the presence of the user (40) in the detection region (44).

The movement signal ($S_M$) may have, at each instant, a value equal to the first value (0) or to the second value (1), the first value (0) of the movement signal ($S_M$) being indicative of the absence of movement at said instant, by the user (40) in the detection region (44) and the second value (1) of the movement signal ($S_M$) being indicative of the movement at said instant of the user (40) in the detection region (44), and the presence signal ($S_P$) may have, at each instant, a value equal to the first value (0) or to the second value (1), the first value (0) of the presence signal ($S_P$) being indicative of the absence at said instant of the user (40) from the detection region (44) and the second value (1) of the presence signal ($S_P$) being indicative of the presence at said instant of the user (40) in the detection region (44).

The step of generating (S12, S14) the one or more feature signals ($S_T$) may include generating (S12), by the control unit (14), a filtered signal ($S_F$) by filtering the charge variation signal ($S_Q$); and generating (S14), by the control unit (14), the one or more feature signals ($S_T$) as a function of the filtered signal ($S_F$).

The step of generating (S14) the one or more feature signals ($S_T$) may include calculating a peak-to-peak amplitude of the filtered signal ($S_F$) and/or a variance of the filtered signal ($S_F$).

The step of generating (S16) the movement signal ($S_M$) may include processing the one or more feature signals ($S_T$) through machine learning techniques.

The step of generating (S16) the movement signal ($S_M$) may include comparing the one or more feature signals ($S_T$) with one or more respective feature threshold values ($A_{threshold}$), and determining the movement signal ($S_M$) as a function of said comparison with the one or more feature threshold values ($A_{threshold}$).

The step of generating (S14) the one or more feature signals ($S_T$) may include calculating said peak-to-peak amplitude of the filtered signal ($S_F$), wherein the step of comparing the one or more feature signals ($S_T$) with the one or more feature threshold values ($A_{threshold}$) may include comparing the respective value of the feature signal ($S_T$) indicative of the peak-to-peak amplitude with a threshold peak-to-peak amplitude ($A_{threshold}$), and the step of determining the movement signal ($S_M$) as a function of said comparison with the one or more feature threshold values ($A_{threshold}$) may include: setting the value at each instant of the movement signal ($S_M$) equal to the first value (0) when the respective value of the feature signal ($S_T$) at said instant is lower than, or equal to, the threshold peak-to-peak amplitude ($A_{threshold}$); or setting the value at each instant of the movement signal ($S_M$) equal to the second value (1) when the respective value of the feature signal ($S_T$) at said instant is greater than the threshold peak-to-peak amplitude ($A_{threshold}$).

The step of generating (S18) the presence signal ($S_P$) may include setting the presence signal ($S_P$) to the first value (0) until the movement signal ($S_M$) assumes the second value (1) and, subsequently: setting the presence signal ($S_P$) to the second value (1) whenever the movement signal ($S_M$) assumes the second value (1) or when a detection interval ($T_{detection}$) has elapsed from when the movement signal ($S_M$) has switched from the first value (0) to the second value (1), the movement signal ($S_M$) having the second value (1) in said detection interval ($T_{detection}$); setting the presence signal ($S_P$) to the second value (1) when the movement signal ($S_M$) assumes the first value (0) and a wait interval ($T_{wait}$) has not yet elapsed from the last instant in which the movement signal ($S_M$) has assumed the second value (1); and after said wait interval ($T_{wait}$) has elapsed from the last instant in which the movement signal ($S_M$) has assumed the second value (1), setting the presence signal ($S_P$) to the first value (0).

The step of generating (S12) the filtered signal ($S_F$) may include filtering the charge variation signal ($S_Q$) through a low-pass filter having a cut-off frequency lower than a threshold cut-off frequency between 1 Hz and 20 Hz.

A control method of an apparatus (10) for activating one or more functionalities of the apparatus (10), the apparatus (10) being usable by a user (40) and may be summarized as including a main control unit (12) operatively coupled to a charge variation sensor (20) including at least one electrode (22) and a control unit (14) electrically coupled to each other, the at least one electrode (22) being configured to detect a respective electric and/or electrostatic charge variation caused by the presence of the user (40) in a detection region (44) of the at least one electrode (22), the control method including the steps of: performing a detection method (50); receiving, by the main control unit (12), the movement signal ($S_M$) and/or the presence signal ($S_P$); and controlling, by the main control unit (12), said one or more functionalities of the apparatus (10) as a function of the movement signal ($S_M$) and/or of the presence signal ($S_P$).

The main control unit (12) may be further operatively coupled to a proximity sensor (35) configured to detect, when the user (40) is in a field of view of the proximity sensor (20), a distance of the user (40) from the proximity sensor (35), and the step of controlling said one or more functionalities of the apparatus (10) may include activating the proximity sensor (35) as a function of the movement signal ($S_M$) and/or of the presence signal ($S_P$).

A computer program product loadable into a control unit (14) of a charge variation sensor (20) which is operatively coupled to apparatus (10) usable by a user (40) and which may be summarized as including at least one electrode (22) electrically coupled to the control unit (14) and configured to detect a respective electric and/or electrostatic charge variation caused by the presence of the user (40) in a detection region (44) of the at least one electrode (22), said computer program being designed in such a way that, when executed, the control unit (14) becomes configured to implement a detection method (50) of the user (40).

A charge variation sensor (20) operatively couplable to an apparatus (10) usable by a user (40), the charge variation sensor (20) may be summarized as including at least one electrode (22) and a control unit (14) electrically coupled to each other, the at least one electrode (22) being configured to detect a respective electric and/or electrostatic charge variation caused by the presence of the user (40) in a detection region (44) of the at least one electrode (22), the control unit (14) being configured to acquire (S10), through the at least one electrode (22), a charge variation signal ($S_Q$) indicative of the presence or absence of the user (40) in the detection region (44); generate (S12, S14), as a function of the charge variation signal ($S_Q$), one or more feature signals ($S_T$) indicative of respective features of the charge variation signal ($S_Q$); generate (S16), as a function of the one or more feature signals ($S_T$), a movement signal ($S_M$) which has a value equal to a first value (0) or to a second value (1), the first value (0) of the movement signal ($S_M$) being indicative of the absence of movement by the user (40) in the detection region (44) and the second value (1) of the movement signal ($S_M$) being indicative of a movement of the user (40) in the detection region (44); and generate (S18), as a function of the movement signal ($S_M$), a presence signal ($S_P$) which has a value equal to a first value (0) or to a second value (1), the first value (0) of the presence signal ($S_P$) being indicative of the absence of the user (40) from the detection region (44) and the second value (1) of the presence signal ($S_P$) being indicative of the presence of the user (40) in the detection region (44).

The charge variation sensor may include a plurality of electrodes (22), each electrode (22) being configured to detect the respective electric and/or electrostatic charge variation caused by the presence of the user (40) in the respective detection region (44) of said electrode (22), and to generate respective detection signals indicative of the respective detected electric and/or electrostatic charge variations, wherein the charge variation signal ($S_Q$) may be generated as a function of said detection signals.

An apparatus (10) usable by a user (40) and operatively coupled to a charge variation sensor (20) may be summarized as including at least one electrode (22) and a control unit (14) electrically coupled to each other, the at least one electrode (22) being configured to detect a respective electric and/or electrostatic charge variation caused by the presence of the user (40) in a detection region (44) of the at least one electrode (22), the control unit (14) being configured to acquire (S10), through the at least one electrode (22), a charge variation signal ($S_Q$) indicative of the presence or absence of the user (40) in the detection region (44); generate (S12, S14), as a function of the charge variation signal ($S_Q$), one or more feature signals ($S_T$) indicative of respective features of the charge variation signal ($S_Q$); generate (S16), as a function of the one or more feature signals ($S_T$), a movement signal ($S_M$) which has a value equal to a first value (0) or to a second value (1), the first value (0) of the movement signal ($S_M$) being indicative of the absence of movement by the user (40) in the detection region (44) and the second value (1) of the movement signal ($S_M$) being indicative of a movement of the user (40) in the detection region (44); and generate (S18), as a function of the movement signal ($S_M$), a presence signal ($S_P$) which has a value equal to a first value (0) or to a second value (1), the first value (0) of the presence signal ($S_P$) being indicative of the absence of the user (40) from the detection region (44) and the second value (1) of the presence signal ($S_P$) being indicative of the presence of the user (40) in the detection region (44).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A detection method of a user of an apparatus operatively coupled to a charge variation sensor having at least one electrode and a control unit electrically coupled to each other, the at least one electrode being configured to detect a respective electric or electrostatic charge variation caused by the presence of the user in a detection region of the at least one electrode, the detection method comprising:
　acquiring, by the control unit and through the at least one electrode, a charge variation signal indicative of the presence or absence of the user in the detection region;
　generating, by the control unit and as a function of the charge variation signal, one or more feature signals indicative of respective features of the charge variation signal;
　generating, by the control unit and as a function of the one or more feature signals, a movement signal which has a value equal to a first value or to a second value, the first value of the movement signal being indicative of the absence of movement by the user in the detection region and the second value of the movement signal being indicative of a movement of the user in the detection region; and
　generating, by the control unit and as a function of the movement signal, a presence signal which has a value equal to a first value or to a second value, the first value of the presence signal being indicative of the absence of the user from the detection region and the second value of the presence signal being indicative of the presence of the user in the detection region.

2. The detection method according to claim 1, wherein the movement signal has, at each instant, a value equal to the first value or to the second value, the first value of the movement signal being indicative of the absence of movement at said instant, by the user in the detection region and the second value of the movement signal being indicative of the movement at said instant of the user in the detection region, and wherein the presence signal has, at each instant, a value equal to the first value or to the second value, the first value of the presence signal being indicative of the absence at said instant of the user from the detection region and the second value of the presence signal being indicative of the presence at said instant of the user in the detection region.

3. The detection method according to claim 1, wherein the generating the one or more feature signals comprises:

generating, by the control unit, a filtered signal by filtering the charge variation signal; and generating, by the control unit, the one or more feature signals as a function of the filtered signal.

4. The detection method according to claim 3, wherein the generating the one or more feature signals comprises calculating a peak-to-peak amplitude of the filtered signal or a variance of the filtered signal.

5. The detection method according to claim 1, wherein the generating the movement signal comprises processing the one or more feature signals through machine learning techniques.

6. The detection method according to claim 1, wherein the generating the movement signal comprises comparing the one or more feature signals with one or more respective feature threshold values, and determining the movement signal as a function of said comparison with the one or more feature threshold values.

7. The detection method according to claim 6, wherein the generating the one or more feature signals comprises calculating said peak-to-peak amplitude of the filtered signal, wherein the comparing the one or more feature signals with the one or more feature threshold values comprises comparing the respective value of the feature signal indicative of the peak-to-peak amplitude with a threshold peak-to-peak amplitude, and wherein the determining the movement signal as a function of said comparison with the one or more feature threshold values comprises: setting the value at each instant of the movement signal equal to the first value when the respective value of the feature signal at said instant is lower than, or equal to, the threshold peak-to-peak amplitude; or setting the value at each instant of the movement signal equal to the second value when the respective value of the feature signal at said instant is greater than the threshold peak-to-peak amplitude.

8. The detection method according to claim 1, wherein the generating the presence signal comprises setting the presence signal to the first value until the movement signal assumes the second value and, subsequently:

setting the presence signal to the second value whenever the movement signal assumes the second value or when a detection interval has elapsed from when the movement signal has switched from the first value to the second value, the movement signal having the second value in said detection interval;

setting the presence signal to the first value when the movement signal assumes the first value and a wait interval has not yet elapsed from the last instant in which the movement signal has assumed the second value; and after said wait interval has elapsed from the last instant in which the movement signal has assumed the second value, setting the presence signal to the first value.

9. The detection method according to claim 3, wherein the generating the filtered signal comprises filtering the charge variation signal through a low-pass filter having a cut-off frequency lower than a threshold cut-off frequency comprised between 1 Hz and 20 Hz.

10. A control method of an apparatus for activating one or more functionalities of the apparatus, the apparatus being usable by a user and including a main control unit operatively coupled to a charge variation sensor having at least one electrode and a control unit electrically coupled to each other, the at least one electrode being configured to detect a respective electric or electrostatic charge variation caused by the presence of the user in a detection region of the at least one electrode, the control method comprising the steps of:

performing a detection method according to claim 1;

receiving, by the main control unit, the movement signal or the presence signal; and controlling, by the main control unit, said one or more functionalities of the apparatus as a function of the movement signal or of the presence signal.

11. The control method according to claim 10, wherein the main control unit is further operatively coupled to a proximity sensor configured to detect, when the user is in a field of view of the proximity sensor, a distance of the user from the proximity sensor, and wherein the step of controlling said one or more functionalities of the apparatus comprises activating the proximity sensor as a function of the movement signal and/or of the presence signal.

12. A computer program product loadable into a control unit of a charge variation sensor which is operatively coupled to an apparatus usable by a user and which includes at least one electrode electrically coupled to the control unit and configured to detect a respective electric or electrostatic charge variation caused by the presence of the user in a detection region of the at least one electrode, said computer program configured to, when executed, cause the control unit to implement a detection method of the user according to claim 1.

13. A charge variation sensor operatively couplable to an apparatus usable by a user, comprising:

at least one electrode configured to detect a respective electric or electrostatic charge variation caused by the presence of the user in a detection region of the at least one electrode; and a control unit electrically couple to the at least one electrode, the control unit being configured to:

acquire, through the at least one electrode, a charge variation signal indicative of the presence or absence of the user in the detection region;

generate, as a function of the charge variation signal, one or more feature signals indicative of respective features of the charge variation signal;

generate, as a function of the one or more feature signals, a movement signal which has a value equal to a first value or to a second value, the first value of the movement signal being indicative of the absence of movement by the user in the detection region and the second value of the movement signal being indicative of a movement of the user in the detection region; and generate, as a function of the movement signal, a presence signal which has a value equal to a first value or to a second value, the first value of the presence signal being indicative of the absence of the user from the detection region and the second value of the presence signal being indicative of the presence of the user in the detection region.

14. The charge variation sensor according to claim 13, comprising a plurality of electrodes, each electrode being configured to detect the respective electric or electrostatic charge variation caused by the presence of the user in the respective detection region of said electrode, and to generate respective detection signals indicative of the respective detected electric and/or electrostatic charge variations,
wherein the charge variation signal is generated as a function of said detection signals.

15. The charge variation sensor according to claim 13, wherein the control unit is configured to generate the one or more feature signals by:
generating, by the control unit, a filtered signal by filtering the charge variation signal; and
generating, by the control unit, the one or more feature signals as a function of the filtered signal.

16. The charge variation sensor according to claim 15, wherein the control unit is configured to generate the one or more feature signals by calculating a peak-to-peak amplitude of the filtered signal or a variance of the filtered signal.

17. An apparatus usable by a user and operatively coupled to a charge variation sensor having at least one electrode and a control unit electrically coupled to each other, the at least one electrode being configured to detect a respective electric or electrostatic charge variation caused by the presence of the user in a detection region of the at least one electrode, the control unit being configured to:
acquire, through the at least one electrode, a charge variation signal indicative of the presence or absence of the user in the detection region;
generate, as a function of the charge variation signal, one or more feature signals indicative of respective features of the charge variation signal;
generate, as a function of the one or more feature signals, a movement signal which has a value equal to a first value or to a second value, the first value of the movement signal being indicative of the absence of movement by the user in the detection region and the second value of the movement signal being indicative of a movement of the user in the detection region; and
generate, as a function of the movement signal, a presence signal which has a value equal to a first value or to a second value, the first value of the presence signal being indicative of the absence of the user from the detection region and the second value of the presence signal being indicative of the presence of the user in the detection region.

18. The apparatus according to claim 17, wherein the control unit is configured to generate the one or more feature signals by:
generating, by the control unit, a filtered signal by filtering the charge variation signal; and
generating, by the control unit, the one or more feature signals as a function of the filtered signal.

19. The apparatus according to claim 18, wherein the control unit is configured to generate the one or more feature signals by calculating a peak-to-peak amplitude of the filtered signal or a variance of the filtered signal.

20. The apparatus according to claim 18, wherein the control unit is configured to generate the filtered signal by filtering the charge variation signal through a low-pass filter having a cut-off frequency lower than a threshold cut-off frequency comprised between 1 Hz and 20 Hz.

* * * * *